United States Patent

[11] 3,607,983

| [72] | Inventors | George L. Rushton;<br>Bobby Ray Martin, both of Trenton, N.J. |
|---|---|---|
| [21] | Appl. No. | 828,709 |
| [22] | Filed | May 28, 1969 |
| [45] | Patented | Sept. 21, 1971 |
| [73] | Assignee | Columbian Carbon Company<br>New York, N.Y. |

[54] PROCESS FOR THE PRODUCTION OF HIGH IMPACT STRENGTH GRAFT POLYMERS
10 Claims, No Drawings

[52] U.S. Cl. .................................................. 260/880 R, 260/29.7
[51] Int. Cl. ............................................. C08f 15/04, C08f 1/13
[50] Field of Search ............................................. 260/880

[56] References Cited
UNITED STATES PATENTS

| 2,820,773 | 1/1958 | Childers et al. | 260/880 |
| 3,073,798 | 1/1963 | Baer | 260/880 |
| 3,287,443 | 11/1966 | Saito et al. | 260/880 |
| 3,288,887 | 11/1966 | Yoshino et al. | 260/880 |
| 3,442,979 | 5/1969 | Ott et al. | 260/880 |

*Primary Examiner*—James A. Seidleck
*Attorney*—J. Richard Geaman

ABSTRACT: Processes are described for the preparation of synthetic resins by polymerizing a mixture of vinyl aromatic and vinyl cyanide monomers in the presence of a small particle size butadiene-styrene copolymer latex. Extruded sheets of this graft polymer product exhibit high impact strengths and possess scuff resistant matte finish surfaces which make them well suited for use in the manufacture of luggage.

PROCESS FOR THE PRODUCTION OF HIGH IMPACT STRENGTH GRAFT POLYMERS

BACKGROUND OF THE INVENTION

1. Field of the Invention

This invention relates to the polymerization of a mixture of vinyl aromatic and vinyl cyanide monomers in the presence of a butadiene-styrene copolymer latex to produce a resinous product in which a portion of the monomers are grafted on the rubbery copolymer. More specifically, it relates to a process for the production of a high impact strength, low gloss synthetic resin by polymerizing a mixture of styrene and acrylonitrile monomers in the presence of an unagglomerated latex of a low gel content butadiene-styrene copolymer at low temperatures employing an inorganic peroxide initiator, a mercaptan polymerization regulator and an anionic surfactant.

2. Description of the Prior Art

The polymerization of a vinyl aromatic monomer, such as styrene, and mixtures of such material with a vinyl cyanide monomer, such as acrylonitrile, in the presence of an aqueous emulsion of an ethylenically unsaturated rubber, such as a butadiene polymer latex, is well known.

Such polymerization reactions, which often are initiated by a free radical source and employ sufficient water and surfactant to emulsify the monomers, result in at least partial grafting of the monomers onto the rubber to produce synthetic resins having superior physical and chemical properties. A wide variety of such synthetic resins, as well as suitable synthesis procedures, rubber latices, monomer mixtures and proportions of reactants are described in the prior art: e.g. U.S. Pat. Nos. 2,994,963; 3,010,936; 3,074,906; 3,130,177; 3,134,746; 3,238,275 and 3,336,417. Typically, these prior art rubber-reinforced resins exhibit impact strength and surface characteristics which fall somewhere between the high impact strength low surface gloss of the rubber component and the low impact strength high surface gloss of a vinyl aromatic-vinyl cyanide copolymer. The physical properties of resins produced by these prior art procedures are primarily dependent on the proportions of the rubber and monomers employed in the polymerization. For example, such prior art procedures have been successfully employed in the preparation of medium gloss resins having Izod impact strengths (ASTM test D 256–47T) of 6 to 9 or more foot pounds per inch of notch by employing rubber levels of from about 30 to about 50 weight percent. While reduction of the rubber level results in improvement in the surface gloss (generally with an accompanying significant loss in impact strength), further increases in the rubber level seldom have more than a minor effect on gloss and may greatly reduce the hardness and rigidity of the resin product. In order to obtain a high impact strength product possessing the scuff resistant matte finish which is desirable for hard-use applications, as in luggage shells, it has been necessary to either mechanically etch the surface of an extruded sheet of resin or to blend the resin, prior to extrusion, with a flattening agent such a diatomaceous earth. Since incorporation of a flattening agent tends to reduce the impact strength of the resin, this technique necessitates the use of extremely high rubber level materials which often are relatively soft and possess an undesirably high degree of flexibility.

SUMMARY

It is an object of this invention to provide a process for preparing a rubber-reinforced synthetic resin having a high-impact strength and a scuff-resistant low-gloss finish. It is a further object of this invention to provide a process for polymerizing a mixture of vinyl aromatic and vinyl cyanide monomers in the presence of a small particle size ethylenically unsaturated butadiene-styrene copolymer rubber latex to produce a resinous product which is suitable for applications in which it is subjected to repeated scuffing and heavy blows, as in luggage shells. A specific object of this invention is to provide a process for the catalytic polymerization of a mixture of styrene and acrylonitrile in the presence of an unagglomerated butadiene-styrene copolymer latex to produce a synthetic resin, extruded sheets of which possess a scuff-resistant matte finish without mechanical etching or the addition of a flattening agent, as well as an unusually high impact strength.

It has now been found that these objects and other features of advantage, which will be apparent from a consideration of the following detailed process description, can be achieved by operation in accordance with this invention.

Broadly, our invention is the discovery of a critical combination of materials and conditions in the inorganic peroxide initiated polymerization of a mixture of vinyl aromatic and vinyl cyanide monomers in the presence of an aqueous emulsion of from about 0.1 to about 1.0 part by weight, per part of said monomer mixture, of an ethylenically unsaturated rubber comprising:

a. employing from about 18 to about 57 mol percent vinyl cyanide monomer in said monomer mixture, b. employing as said rubber a butadiene-styrene copolymer containing from about 20 to about 30 weight percent bound styrene and having an average particle size of from about 0.05 to about 0.2 microns, a gel content of less than about 80 percent and a swelling index in benzene of greater than about 40, c. conducting said polymerization in the presence of from about 0.002 to about 0.03 equivalents of mercaptan polymerization regulator and an anionic surfactant containing less than about 0.12 equivalents of alkali metal per kilogram of said monomers and rubber, and d. maintaining a polymerization temperature of from about 45° C. to about 55° C. until at least about 85 weight percent of said monomer mixture has reacted.

The rubber-reinforced resin products produced by operation in accordance with this invention exhibit a higher impact strength at equivalent rubber levels than similar materials produced by prior art procedures and are suitable for extrusion into sheets which have a scuff resistant matte finish.

DESCRIPTION OF THE PREFERRED EMBODIMENTS

The improved process of this invention can be carried out simply by mixing the rubber latex, monomers, surfactant, polymerization regulator and inorganic peroxide catalyst and heating the agitated mixture at the aforementioned temperature until at least 85 weight percent of the monomers have reacted. This usually takes from about 3 to 6 hours. While any order of mixing these materials may be employed, the results are generally most satisfactory when the catalyst is added last and this addition is delayed until the stirred reaction mixture has been heated to the selected reaction temperature. Coagulation, separation and drying of the resin product can then be carried out by conventional means; e.g. by pouring the reaction mixture into an aqueous solution of electrolyte to coagulate the resin product, heating the mixture to agglomerate the coagulum, recovering the solid resin by filtration and then heating it to dryness.

The styrene-butadiene copolymer rubber that can be used in the process of this invention preferably contains from about 20 to about 26 weight percent combined styrene and has a gel content of less than about 15 percent with a swelling index in benzene of greater than about 40. It is a preferred embodiment of this invention to employ a latex of such rubber having an emulsified particle size distribution within a narrow range, as is commonly found in unagglomerated latices having an average particle size of from about 0.05 to about 0.09 microns. Outstanding results can be obtained by using an unagglomerated latex in which the average emulsified rubber particle has a diameter of from about 0.05 to about 0.07 microns and the gel content of the rubber is 0.

The latices of such rubbers are advantageously used in a quantity to provide from about 0.15 to about 0.45, preferably from about 0.25 to about 0.3, parts of rubber per part of the mixed vinyl aromatic and vinyl cyanide monomers.

The mixture of the vinyl aromatic monomer, such as styrene or alphamethylstyrene, and the vinyl cyanide monomer, such as acrylonitrile or methacrylonitrile, can contain from as little as from 18 mol percent to as much as 57 mol percent of the vinyl cyanide component. It is generally preferable, however, to maintain the vinyl cyanide level at from about 40 mol percent to about 46 mol percent of the monomer mixture.

As indicated above, the polymerization process of this invention must be conducted in the presence of an anionic surfactant containing less than about 0.12 equivalents of alkali metal per kilogram of monomers and rubber. At higher surfactant levels, there is a marked lowering of graft efficiency and resulting deterioration in the physical properties of the resin product. The magnitude of this effect, which is particularly notable when employing a latex having an average particle size of less than about 0.09 microns, is evident from a comparison of examples I and II, which differ only in that the latter employs an excessive amount of surfactant. Generally, results are most satisfactory when the surfactant is employed in a quantity sufficient to provide from about 0.02 to about 0.08, preferably from about 0.03 to about 0.05, equivalents of alkali metal per kilogram of rubber and monomers. A wide variety of anionic surfactants containing alkali metal ions are suitable for use in the process of this invention. Among these are the readily available alkali metal salts of higher alkyl benzene sulfonic acids and soaps of rosin or higher fatty acids, such as sodium stearate, potassium oleate and the mixed soap obtained by saponifying tall oil with caustic soda or potash.

The use of an inorganic peroxide initiator is essential to the satisfactory operation of the process of this invention, with outstanding results being obtained through the use of the alkali metal or ammonium persulfates. Generally, it is necessary to employ these preferred initiators in a quantity sufficient to provide at least about 0.004, and preferably at least about 0.007, peroxide equivalents per kilogram of rubber and mixed monomers. There is no sharply critical upper limit; however, there seldom is any advantage in exceeding about 0.075 peroxide equivalents per kilogram of rubber and mixed monomers and superior results are usually obtained when operating within the range of about 0.02 to about 0.045 peroxide equivalents.

While any mercaptan may be employed as a chain-length regulator in the process of this invention, the use of an alkyl mercaptan and particularly a higher tertiary alkyl mercaptan is greatly preferred. Examples of such preferred materials include the tertiary $C_{12}$, $C_{14}$ and $C_{16}$ alkyl mercaptans, and mixtures thereof. The concentration of such mercaptans in the reaction mixture is a critical feature of this invention. It is essential that the reaction mixture contain no more than about 0.03 mercaptan equivalents per kilogram of rubber and monomer, as it has been found that the impact strength of the product drops sharply when this figure is exceeded. A maximum of about 0.028 mercaptan equivalents is greatly preferred. While it is often possible to employ as little as about 0.002 mercaptan equivalents, it is usually desirable that the minimum concentration be at least about 0.004 mercaptan equivalents, in order to avoid the production of a product which forms an excessively stiff extruded sheet. The preferred operating range is from about 0.014 to about 0.026 mercaptan equivalents with outstanding results being obtained at levels of from about 0.019 to about 0.025 mercaptan equivalents per kilogram of rubber and monomers.

The water content of the reaction mixture of this invention is not critical, with satisfactory results being obtained in systems containing from as little as about 50 weight percent water to as much as 90 weight percent or higher. Generally, however, it is preferred to employ a system containing of from about 60 to about 70 weight percent water.

In order to obtain rubber reinforced resin products having the desirable physical characteristics described above, it is essential that the reaction temperature be maintained within the range of from about 45° C. to about 55° C. until at least about 85 weight percent, and preferably at least about 95 weight percent, of the monomer mixture has reacted. Maintenance of a reaction temperature between about 48° C. and 52° C. until monomer conversion is essentially complete represents an especially preferred embodiment of this invention. It is highly desirable to hold the reaction temperature as nearly constant as possible, with outstanding results being obtained when this fluctuation is restricted to a range of about 2° C. or less.

The numerous advantages inherent in operations conducted in accordance with this invention will be evident from an examination of the following examples.

EXAMPLE I

A stainless steel reactor equipped with a stirrer is purged with nitrogen and charged with 300 pounds of demineralized water and 218 pounds of an unagglomerated 22 weight percent butadiene-styrene copolymer rubber latex (48 pounds of rubber) having an average emulsified particle diameter of 0.06 microns. The butadiene-styrene copolymer, which contains 23.5 weight percent combined styrene, has a gel content of 0 and an infinite swelling index in benzene. The latex also contains 0.5 weight percent (1.09 pounds) of sodium stearate stabilizer. To this is added a solution of 0.72 pounds of sodium stearate in 30 pounds of demineralized water, a mixture of 144 pounds of styrene and 48 pounds of acrylonitrile and 1.2 pounds of mixed tertiary $C_{12}$, $C_{14}$ and $C_{16}$ alkyl mercaptans having an average molecular weight of about 218. At this point the reactor contains about 0.025 equivalents of sodium stearate and about 0.023 equivalents of mercaptan per kilogram of rubber and monomers. The acrylonitrile monomer amounts to about 40 mol percent of the styrene-acrylonitrile monomer mixture and the weight ratio of mixed styrene-acrylonitrile monomer to rubber is about 1:0.25. The mixture is heated with stirring to 50° C. and when this temperature is reached, a solution of 0.72 pounds of potassium persulfate catalyst in 32 pounds of demineralized water is added. This quantity of catalyst represents about 0.022 equivalents of peroxide per kilogram of rubber and monomer. The reaction mixture is maintained at 50° C., plus or minus 1° C., for 6 hours, at which time monomer conversion is essentially quantitative. About 15 minutes before the end of this period, 8 pounds of antioxidant ("Superlite," a butylated bis phenol A) is added to the emulsified reaction mixture. The reaction mixture is then cooled to room temperature and poured at a uniform rate over a period of 10 minutes into a solution of 8 pounds of anhydrous calcium chloride in 100 gallons of demineralized water. This mixture is stirred for five minutes and then heated to 95° C. After 4 to 5 minutes at this temperature, a large volume of cold water is added to reduce the temperature of the mixture to about 40° C. The cooled mixture is transferred to a centrifuge filter, where the coagulated resin product is separated and then rinsed with a large volume of cold water. The filter cake is then transferred to a drying oven where it is heated under a pressure of 27 inches mercury until the resin temperature reaches 95° C. After being held at this temperature for 30 minutes, it is removed from the oven and cooled. Measurements on molded test samples made of this 20 percent rubber-reinforced product show an Izod impact strength of 10 to 12 foot pounds per inch of notch at room temperature. The hard, highly scuff-resistant surface has a uniform matte finish which measures 10 to 15 on a Gardner glossmeter.

EXAMPLES II - VI

The criticality of various materials and reaction conditions limitations described above and illustrated by example I are demonstrated by examples II through VI. In each case the procedure is identical to that of example I, except that a single material or condition has been changed as noted in the following table.

| Example | Procedural Variation | Comments |
| --- | --- | --- |
| II | 0.15 equivalents sodium stearate/kg. rubber and monomers. | reduced Izod impact strength product with soft surface having non-uniform gloss. |
| III | no mercaptan. | low reaction rate-very stiff medium gloss product. |
| IV | 0.05 equivalents n-octyl mercaptan. | Izod impact strength of product less than 4 with medium gloss. |
| V | 75°C. reaction temperature. | Izod impact strength of product less than 4 with medium gloss |
| VI | latex of butadiene-styrene copolymer crosslinked with divinyl benzene having a gel content of about 85% with a swelling index in benzene of about 12 and an average particle diameter of about 0.2 microns. | Izod impact strength of product less than 4 with high gloss. |

EXAMPLE VII

The procedure of example I is repeated except that the reaction temperature is maintained at 54° C., plus or minus 1° C. The surface characteristics of the resin product are substantially identical to those of the product of example, with an Izod impact strength of 7 to 9.

It will, of course, be understood that various changes may be made in the embodiments of this invention illustrated by examples I and VII, above, without departing from the spirit and scope of the invention as defined in the following claims:

We claim:

1. Process for the production of a high impact strength low-gloss synthetic resin comprising polymerizing a mixture of vinyl aromatic and vinyl cyanide monomers containing from about 18 to about 57 mole percent vinyl cyanide at a temperature of from about 45° C. to about 55° C. in the presence of
   a. an inorganic peroxide initiator,
   b. an aqueous emulsion of from about 0.1 to about 1.0 parts by weight per part of said monomer mixture of a butadiene-styrene copolymer rubber containing from about 15 to about 30 weight percent bound styrene and having an average particle size of from about 0.05 to about 0.2 microns, a gel content of less than about 80 percent and a swelling index in benzene of greater than about 40,
   c. from about 0.002 to about 0.03 equivalents of mercaptan polymerization regulator per kilogram of said monomers and rubber and
   d. an anionic surfactant selected from alkali metal salts of higher alkyl benzene sulfonic acids and alkali metal soaps of rosin, higher fatty acids and tall oil, said surfactant containing less than about 0.12 equivalents of alkali metal per kilogram of said monomers and rubber, and maintaining said polymerization temperature until at least about 85 weight percent of said monomer mixture has reacted.

2. The process of claim 1, wherein said butadiene-styrene copolymer contains from about 20 to about 26 weight percent bound styrene and has an average particle size of from about 0.05 to about 0.09 microns and a gel content of less than about 15 percent.

3. The process of claim 1, wherein said polymerization is conducted in the presence of from about 0.004 to about 0.028 equivalents of mercaptan per kilogram of said monomers and rubber.

4. The process of claim 3, wherein said polymerization is conducted in the presence of from about 0.014 to about 0.026 equivalents of mercaptan per kilogram of said monomers and rubber.

5. The process of claim 1, wherein said anionic surfactant is an alkali metal soap of rosin or a higher fatty acid containing from about 0.02 to about 0.08 equivalents of alkali metal per kilogram of said monomers and rubber.

6. The process of claim 5, wherein said alkali metal soap contains from about 0.03 to about 0.05 equivalents of alkali metal per kilogram of said monomers and rubber.

7. The process of claim 1, wherein said polymerization is initiated by an alkali metal or ammonium persulfate.

8. The process of claim 1, wherein said polymerization is conducted at a temperature of from about 48° C. to about 52° C. until at least about 95 weight percent of said monomer mixture has reacted.

9. Process for the production of a high impact strength low-gloss synthetic resin comprising polymerizing a mixture of styrene and acrylonitrile monomers containing from about 40 to about 46 mol percent acrylonitrile at a temperature of from about 48° C. to about 52° C. in the presence of
   a. an alkali metal or ammonium persulfate initiator,
   b. an aqueous emulsion of from about 0.25 to about 0.3 parts by weight per part of said monomer mixture of a butadiene-styrene copolymer rubber containing from about 20 to about 26 weight percent bound styrene and having an average particle size of from about 0.05 to about 0.09 microns, a gel content of less than about 15 percent and a swelling index in benzene of greater than about 40,
   c. from about 0.014 to about 0.026 equivalents of a tertiary higher alkyl mercaptan polymerization regulator per kilogram of said monomers and rubber and
   d. an alkali metal soap of a rosin or higher fatty acid containing from about 0.03 to about 0.05 equivalents of alkali metal per kilogram of said monomers and rubber, and maintaining said polymerization temperature until at least about 85 weight percent of said monomer mixture has reacted.

10. The process of claim 9, wherein said polymerization is conducted in the presence of at least about 0.004 equivalents of peroxide per kilogram of said monomers and rubber.

UNITED STATES PATENT OFFICE
CERTIFICATE OF CORRECTION

Patent No. 3,607,983                                  Dated Sept. 21, 1971

Inventor(s) George L. Rushton and Bobby Ray Martin

It is certified that error appears in the above-identified patent and that said Letters Patent are hereby corrected as shown below:

Assignee should read --- CITIES SERVICE COMPANY

Signed and sealed this 28th day of March 1972.

(SEAL)
Attest:

EDWARD M. FLETCHER, JR.　　　　　ROBERT GOTTSCHALK
Attesting Officer　　　　　　　　Commissioner of Patents